J. B. SPEED AND F. HUTCHINSON, Jr.
STORAGE BATTERY.
APPLICATION FILED APR. 3, 1920.
1,426,786.
Patented Aug. 22, 1922
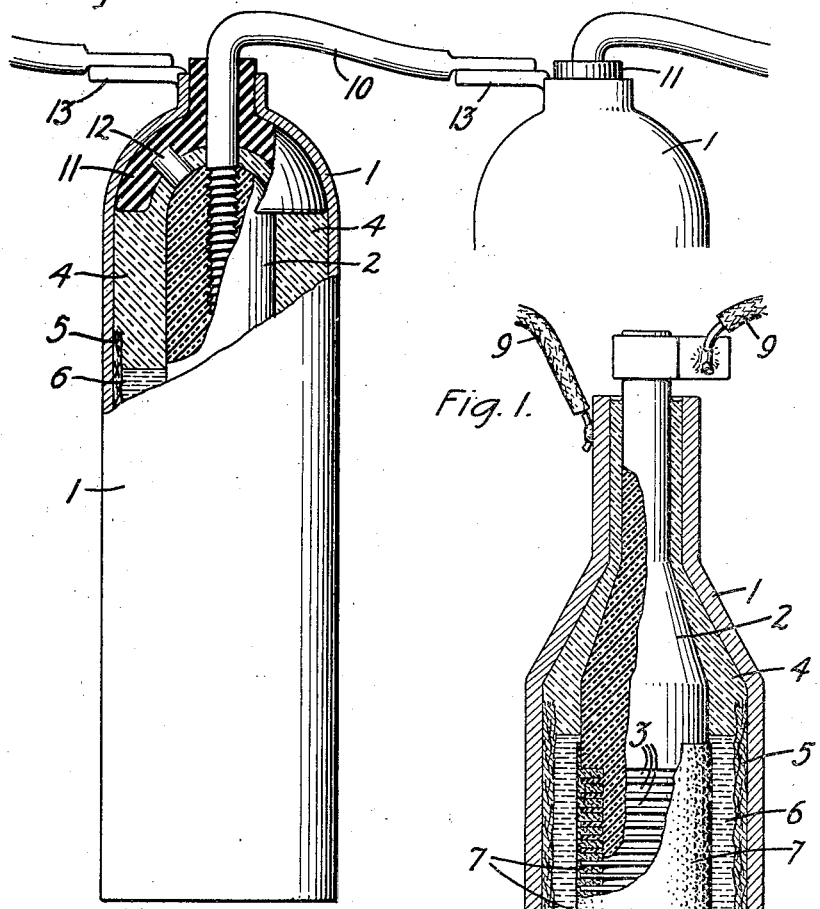
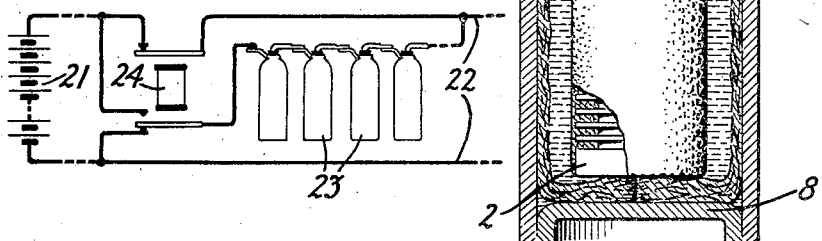
Inventors:
James Buckner Speed
Franklin Hutchinson Jr.
by *Jael Ck. Palmer* Att'y.

UNITED STATES PATENT OFFICE.

JAMES BUCKNER SPEED, OF NEW YORK, AND FRANKLIN HUTCHINSON, JR., OF BROOKLYN, NEW YORK, ASSIGNORS TO WESTERN ELECTRIC COMPANY, INCORPORATED, OF NEW YORK, N. Y., A CORPORATION OF NEW YORK.

STORAGE BATTERY.

1,426,786.      Specification of Letters Patent.      Patented Aug. 22, 1922.

Application filed April 3, 1920. Serial No. 370,972.

*To all whom it may concern:*

Be it known that we, JAMES BUCKNER SPEED and FRANKLIN HUTCHINSON, Jr., citizens of the United States, residing at New York, in the county of New York and State of New York, and at Brooklyn, in the county of Kings and State of New York, respectively, have invented certain new and useful Improvements in Storage Batteries, of which the following is a full, clear, concise, and exact description.

This invention relates to devices which are employed for the storage of electrical energy by chemical means and the conversion of the chemical energy into electricity, and more particularly to those which are designed for intermittent service.

In transmitting electricity over electrical conductors in a telephone system, when the source of the electrical power is the so-called storage battery, provision must be made so that a constant potential value may be had at all times. The factors which tend to cause changes in the voltage of the system as a whole are: line resistance, load variation, and decrease of the potential of the batteries, caused by progressive discharge. End cells and line batteries have been employed in the past as boosters in order to compensate for the variations which are caused as stated above. Their use, however, is attended with many disadvantages; for instance, said batteries not being in continuous operation cannot be handled in the same way in which the central office batteries are. It is common knowledge that all storage batteries must receive an overcharge at certain intervals to keep the active material in good condition. The loss of water from the electrolyte through mechanical displacement of the gases evolved through the chemical decomposition of the water and by evaporation necessitates an addition of the same at frequent intervals. Due to the inherent characteristics of the lead storage battery, it must be installed in places where the fumes evolved and the acid incidently spilled will not cause damage to persons and property. Sulphating of the batteries after they have been in use for a while necessitates the replacement of some, if not all, of the negative and positive grids. There is, therefore, a demand for a storage battery which will be free from the objections above noted and one which will operate in a satisfactory manner no matter in what position it may be placed.

An object of this invention is to produce a device which may be readily substituted for the floating storage battery now in use and yet be hermetically sealed so that it may be placed anywhere without danger of causing damage to persons and property, and so that no further attention after its installation will be required.

Another object of this invention is to provide a device which after undergoing discharge may be recharged with a minimum of potential loss.

The construction of the battery according to the present invention depends upon the discovery that a mixture of depolarizing oxides may be formed by electrolysis of certain electrolytes containing metallic ions when the voltage impressed thereon is less than that required to cause the formation of gaseous products from said electrolyte. Heretofore it has been considered necessary to actually liberate gas from the cell in order to accomplish this result. On account of this fact, therefore, the battery necessarily had to be provided with a vent in order that the liberated gases might be freed. As mentioned above, the ordinary type of lead storage battery, due to the manner in which it is constructed, requires the evolution of gases in order to carry out the chemical reactions necessary for the recharging of the cell. In the battery which is the subject of this invention no such action is required. The charges which take place do not depend in any what whatever upon the liberation of gaseous products, and on account of this the battery may be hermetically sealed, thus preventing evaporation of the electrolyte and the necessity of keeping the battery in any particular position.

Before proceeding with the description of the general construction of the battery which has been found well suited for the carrying out of the invention, a brief mention will be made of the electro-chemical principles involved and upon which the action of the device depends:

It is common knowledge that the elements or homogeneous mixtures of elements, such as alloys, compounds, etc., display a certain potential difference between one another if connected by a wire or other electrical conductor when immersed in an electrolyte, such as for example, acidulated water. If this potential difference is greater than that required for the decomposition of the electrolyte, the latter will decompose and the formation of gaseous compounds will be observed. Thus, if a rod of carbon and a strip of zinc be placed in acidulated water and connected by a wire of good electrical conductivity, gases will be evolved at each of these electrodes. If a senstive ammeter be placed in the circuit, it will be noticed that directly the circuit is closed, a sudden rush of current ensues which, however, drops to a very small value immediately thereafter. This is due to the so-called polarization effect.

Since there have been numerous theories advanced as to the direction in which the current set up by such an electrical potential passes, it will be necessary to assume a certain direction for the purpose of this explanation. It must be clearly understood, however, that this assumption does not in any way limit the scope of the invention at hand and it may readily be described should other theories be resorted to. Attention is therefore called to the table of electrode potentials as it is given in "Introduction to Physical Chemistry" by James Walker (MacMillan & Co., 7th edition, 1913, on page 368). When any two of the elements which are listed in that table are plunged in an electrolyte and connected through an external circuit, the direction of the current, induced by the difference in potential, through the electrolyte is presumed to be from the element which possesses the higher potential value to that one which possesses the lower potential value. Therefore, in referring to the direction of the passage of the current herein, it is to be understood that it is considered to pass from the electrode having the higher potential value through the liquid medium to the electrode of lower potential value and so on through the remainder of the electrical circuit.

It is customary to overcome the polarization effect referred to above by the addition of a so-called depolarizer to the lower potential electrode. Since the depolarizer itself possesses a potential value when immersed in the electrolyte, the composite electrode comprising the element and the depolarizer will have a potential value substantially different from that shown by the two separate substances.

Instead of the carbon zinc couple which was referred to above, suppose that a couple consisting of lead-copper be employed. In this case the potential difference being less than that required to decompose the electrolyte, no evolution of gas is observed when the electrical circuit is completed. In spite of this fact, however, if the current passing between the two electrodes be measured, it will be found that the same phenomenon is observed as was noted in the case of the elements whose potential difference was high enough to cause evolution of gas in like manner the diminution of the current may be prevented by the addition of a depolarizer to the electrode of the lower potential value. In this case the resulting potential of the composite electrode must be of such a value that the difference will still be less than that required to cause evolution of gas to take place in the electrolyte, in other words less than 1.437 volts, if the electrolyte is an aqueous solution. This can be easily attained by selecting the proper depolarizer to be used. Where reference is made hereinafter to the lower potential electrode, the composite electrode comprising the depolarizer is meant.

The device of this invention, therefore is one in which this depolarizing mixture may be supplied to the lower potential electrode, although the impressed charging voltage is less than that required to produce gaseous products from the electrolyte. Such a device has heretofore been unknown on account of the fact that it has been previously considered necessary to use a much higher voltage to form such depolarizer, thus setting free gases at the lower potential electrode.

Such a cell, therefore, will be capable of generating an E. M. F. and also capable of transmitting a comparatively high current when used as a source of potential, the current value depending, as it does in most devices of this sort, upon the internal resistance of the cell. Many different combinations of elements may be taken to obtain a battery which will perform in the manner described. For the preferred form of the invention the couple lead-carbon has been chosen. Although the potential value of carbon is not given in the table referred to, it may be taken as being approximately —1.5.

In selecting a suitable electrolyte for such a cell, it is necessary that one be found which will form a soluble compound with the element or elements of which the higher electrode is composed. Thus, when the cell is discharged, the higher potential electrode tends to dissolve in the solution, and in order that no compounds be lost, it is essential that they be kept in a condition from which they may be later deposited on the electrodes. A compound which is thrown down as insoluble during the action of the electrolytic cell cannot under ordinary conditions be restored to a soluble form by the mere passage of the current in the other direction. Herein the battery, which is the subject of this invention, differs in one respect from the ordinary type of lead storage battery. In the latter case insoluble lead compounds are formed during the passage, and their conversion into the original substances requires a considerable overcharge in order that sufficient gas be evolved to carry out the reduction or oxidation, as the case might be. Thus the negative or lead grid under discharge becomes covered with compounds of lead, sulphur and oxygen and these cannot be broken up to give the original substances unless a large amount of hydrogen gas is generated. In the present battery, however, when the discharge takes place, the metal constituting the higher potential electrode dissolves in the electrolyte from which it may subsequently be plated out on the same electrode when the external E. M. F. is applied in the opposite direction. Likewise the depolarizer being formed as a compound of the higher potential electrode, is capable of being decomposed into the ionic form on the discharge of the battery. No attempt will be made to describe the chemical reactions involved during the cycle of operation in such case, since they are not at this time thoroughly understood. Suffice it to say, however, that the operation of the battery as designed in accordance with this invention has shown that the reactions which take place herein are reversible and no diminution of the efficiency of the device has been apparent over a very long period of operation.

Great care must be exercised to choose an electrolyte which will not become too acid during the recharging. For example, a salt of the higher potential element alone is not well suited for use on account of the setting free of acid when the metallic ions are removed therefrom. If this should be allowed to take place, the acid liberated would attack the electrode and cause the evolution of gas. It has been found that the best results are obtained when the electrolyte contains a salt or salts of the alkali or alkaline earth metals. The small amount of acid which is set free when such an electrolyte is employed is not sufficient to cause the liberation of hydrogen. It is desirable also to use a salt which is derived from a so-called weak acid, that is, one which is not highly ionized in the solution.

It has been found desirable to initially coat the lower potential electrode with a film of the depolarizer in order that the battery may be ready for use as soon as it is assembled. This may be done by either placing therein directly the depolarizer or by utilizing other chemical compounds and forming the depolarizer therefrom by electrolytic oxidation or reduction. Another possible method of forming the depolarizer is to add a salt of the higher potential electrode to the electrolyte and then subject the battery to charge until all the metallic ions have been removed from the solution. It is obvious that depolarizers may be added to the cell other than those which might be formed during the normal operation of the cell. The only limitation which must necessarily be put on such a use, however, is that such depolarizer must not affect the reversibility of the device.

Referring now to the drawings which will enable one skilled in the art to understand more fully the application and preferred form of the invention, Figure 1 shows a section of the cell taken parallel to its longer axis; Figure 2 shows a modification in design of the terminal arrangement of the inner electrode, and Figure 3 shows one possible application of the invention.

In Figure 1 the outer casing 1, which is made somewhat in the shape of a bottle comprises one of the electrodes of the battery, which in the preferred form is composed of lead or an alloy of lead. The thickness of this container electrode will depend primarily upon the probable demand which will be made upon the battery when put in use, that is, provision must be made so that the sheath will not be eaten through due to the electrolytic action which takes place. Local action which would tend in a similar way to break down this outer sheath may be prevented by a careful selection of the metal or alloy from which said sheath is made. While it has been found that the metal which is deposited from the electrolyte during the recharge period apparently distributes itself evenly over the inside of the outer electrode, it is obvious that due to various combinations of circumstances this might be prevented when the battery is subjected to extraordinary conditions. Hence, the thickness of this outer electrode must be determined with these several points in view. On the other hand, if a comparatively light battery be desired and the life is secondary to the weight, the outer sheath may be made thin.

The inner electrode 2 is in this case made from hard graphitic carbon such as that employed in making electrodes for electric arc furnace use. Its shape in general is made to conform to that of the outer electrode in order that an equal drop of potential may be had between corresponding points on the active surface of the two electrodes. The electrode 2 is made long enough to protrude above the top of the outer electrode in order that a satisfactory electrical connection may be made. In some cases if a greater supply of current is desired, the effective area of the carbon electrode may be increased by cutting circular grooves therein as shown in Figure 1 by "3". The carbon electrode is firmly held in place by an electrical insulating compound "4". Bituminous bars or the like, which will on heating permit of being poured into position and then hardening, have been found suitable for this use. It has been found desirable in some instances to reduce the sealing compound to small pieces placing them in the inverted cell and then applying heat in order to render it fluid. This method will prevent any of the compound from adhering to the active surface of the electrodes.

A diaphragm 5 is provided between the inner surface of the outer electrode and the electrolyte. Cloth, which is more or less loosely woven, such as for example, lamp wick, has been found extremely satisfactory. Although shown in the drawing as being placed next to the inner surface of the outer electrode, it is desirable in some cases to place it adjacent the surface of the inner electrode. The top of the wick is allowed to penetrate into the insulating compound before the latter hardens in order that it may be firmly held in place. The wick is made of a sufficient length in order that it may be folded over at the bottom of the carbon electrode to sufficiently protect it from the lead base.

The electrolyte 6 consists primarily in the preferred form of sodium acetate. The strength of the solution should be made such that a maximum conductivity may be had while not sufficiently concentrated to cause the salt to crystallize out during use or when subjected to extreme temperatures. A coating of lead oxide 7 is placed on the carbon electrode and pressed into the grooves. The space between this oxide covering and the porous diaphragm may be filled with crushed carbon, each particle of which is in conductive relation with another such particle. In this manner the active surface of the inner electrode may be greatly increased. It has been found desirable in such a case to mix with this crushed carbon a small amount of lead oxide to bring about a depolarizing effect on the surface of the enlarged electrode. Although mechanical mixing of these two substances may accomplish the desired result, the oxide may be deposited on the surface of the carbon electrolytically.

After the battery has been assembled in the manner shown above, the cup shaped inverted bottom 8 is forced into position and held there by soldering or lead burning the same to the surface of the outer electrode. Thus a battery is provided which is hermetically sealed and one which can be operated in any position.

Figure 2 shows a modification in design of the battery. Instead of attaching the terminal 9 as shown in Figure 1 to the carbon electrode, the latter may be cut off before it passes through the neck of the outer electrode and a leaden or other terminal 10 screwed down into the carbon in a centrally located tapped hole. In case such a construction is employed, it is necessary to seal up all the pores of the carbon electrode adjacent the terminal in order to prevent local action developing should the electrolyte seep through. It has been found that this may be prevented somewhat by pouring into the tapped hole bituminous material or the like to which has been added a suitable solvent or vehicle to render it capable of flowing at room temperature. After a sufficient amount of this material has been taken up by the carbon, the remainder is poured off. This treatment, it has been found, in no way interferes with the electrical contact between the carbon and the leaden terminal. The insulating bushing 11 is provided with small pegs 12 in order to preserve the alignment of the inner electrode in case the sealing compound employed should soften on account of the battery being in a warm place. It will not be noticed from the drawing that in this construction the lip 13 forms one part of the outer electrode and the lip provided at the end of the terminal 10 allows a ready connection to be made with adjacent cells when more than one is required for a particular installation. Although in this construction a better electrical connection may be had, great care must be taken in manufacture on account of the possibility of local action developing on the surface of the metallic terminal 10 in the tapped hole.

Figure 3 shows one application of this battery in telephone service. It is frequently required to operate switches or the like at quite a distance from the main source of electrical energy, but on account of the potential drop due to the length of the line, it is necessary to provide some means of supplying the lost power when needed. The current which this booster must supply in such a case is quite small but the voltage necessary will be in some cases as high as 10 or 15 volts. For this purpose the battery as designed is admirably suited. Its operation in connection with such a circuit will be hereinafter discussed.

In Figure 3, "21" represents the battery at the central station which supplies current to the distant substation 22, where electrical switches are to be operated. The booster battery 23 is placed near the substation 22 and connected in such a manner that it floats across the line thus allowing the central office battery to be in normal electrical connection with it. The current generated by the central office battery will tend to flow through the line circuit to the carbon electrode of the booster battery through the latter to the lead electrode and then back to the line. However, if such a battery has been constructed in the manner pointed out above, no current or practically no current will flow through the circuit as thus described. Care must be exercised that the number of booster cells taken is great enough so that no gas will be developed within them. That is, in no case should the number obtained by dividing the maximum value of the impressed voltage at the particular point of installation of the booster batteries by the number of booster batteries employed be greater than 1.437. In actual operation better results are obtained if the maximum value of this ratio is much lower, say even as low as 1. When the circuit is completed at the substation 22, the relay 24 becomes energized, thus placing the booster battery in series with the central office battery. After the additional power to throw the switch or switches has been availed of the booster battery again falls back into its original parallel connection and undergoes a recharging from the central office battery.

The recuperation of such a battery depends primarily upon the rate at which the dissolved metallic ions may be removed from solution. When this point is reached and then only will the flow of current therethrough diminish to a minimum value.

If a large current drain is anticipated, the battery may take the form of the original storage battery wherein the maximum active surface is obtained. The construction of the cell in such a case will differ from the storage battery in that the positive grid and electrolyte would be selected so as to conform to the requirements as stated above. In any form of construction, however, the battery is well adapted to be placed in a circuit, where, although the current drain is comparatively large, a sufficient period of time is allowed for the recuperation of the cell.

Although in the preferred form of the battery the higher potential electrode has been made to serve as a casing for the contents of the battery, it is obvious the arrangement might be reversed and the lower potential electrode be made to serve in a similar capacity.

The surface of the higher potential electrode may be treated in a special manner in order to obtain a more satisfactory operation of the battery. For example, it has been found, if the surface is scored somewhat and a film of electrolytically deposited metal is placed thereon, a greater current drain is possible. In some cases it is desirable to incorporate additional agents in the electrolyte in order to insure an even plating out of the higher potential metal and to prevent the electrolytic deposit from becoming disengaged from the surface and causing short circuits to develop. Difficulties experienced on account of treeing are thus obviated. Aqueous solutions have been discussed hereinbefore in connection with the electrolyte which may be used in this battery. It is possible, however, to substitute electrolytes which contain no water and secure a satisfactory operation of the battery.

Thus a battery is provided which will, when operated in the manner set forth herein, be capable of adaptation to circuits in which the ordinary type of lead storage battery is unfitted for use. No claim is made that a battery constructed along the lines as indicated will not generate gas when subjected to an external E. M. F. which is greater than 1.437 volts per cell, since this would be contrary to the established scientific fact. It is, however, prima facie evident that this invention discloses a device which unlike the ordinary type of storage battery is capable of storing and yielding electrical energy without becoming depreciated and causing the formation of any gaseous compound whatever.

What is claimed is:

1. A hermetically sealed storage battery comprising an electrolyte and two electrodes whose potential difference is less than that required to liberate gases from the electrolyte.

2. A hermetically sealed storage battery comprising an electrolyte and two electrodes whose potential difference is not greater than 1.437 volts.

3. A hermetically sealed storage battery comprising an electrolyte, two electrodes whose potential difference is less than that required to liberate gases from the electrolyte and a depolarizer all or part of which is a derivative compound of the higher potential element and which is capable of being formed therefrom at said low voltage.

4. A hermetically sealed storage battery comprising an electrolyte, two electrodes whose potential difference is less than 1.437 volts and a depolarizer which is a compound of the higher potential element and which is capable of being formed therefrom at this voltage.

5. A hermetically sealed storage battery comprising an electrolyte, an outer container serving as an electrode, and an inner electrode having a depolarizer at its surface; the potential difference between the electrodes being less than that required to liberate gases from the electrolyte.

6. A hermetically sealed storage battery comprising an electrolyte, an outer container serving as an electrode, an inner electrode having a depolarizer at its surface; the potential difference between the electrodes being not greater than 1.437 volts.

7. A hermetically sealed storage battery comprising an electrolyte consisting of one or more of the alkali or alkaline earth metal salts, two electrodes whose potential difference is less than that required to liberate gases from the electrolyte, and a depolarizer, all or part of which is a derivative compound of the higher potential element.

8. A hermetically sealed storage battery comprising an electrolyte consisting of one or more of the alkali or alkaline earth metal salts, two electrodes whose potential difference is not greater than 1.437 volts, and a depolarizer, all or part of which is a derivative compound of the higher potential element.

9. A hermetically sealed device adapted to be operated reversibly in storing and yielding electrical energy through the agency of chemical changes, comprising an electrode container of lead or lead alloy, an inner electrode of graphite or other carbon and an electrolyte composed of a solution of one or more salts of the alkali or alkaline earth metals.

10. A hermetically sealed device for yielding and storing electrical energy, comprising a graphite rod cut or grooved over its surface in which is placed one or more oxides constituting a depolarizing mixture.

11. In combination, a lead or lead alloy container, having disposed therein a carbon rod conforming in shape to that of the container, having on its surface a coating of lead oxides surrounded by an electrolyte, said container being hermetically sealed.

12. A hermetically sealed device for yielding and storing electrical energy, comprising an outer container, said container serving as an electrode, an inner electrode having a depolarizer at its surface, a solution of a salt in which the material composing the container will dissolve under the influence of electrolytic action, and a fibrous separating material between the inner surface of said container and said inner electrode.

13. A hermetically sealed device for yielding and storing electrical energy comprising a bottle-shaped container electrode, a carbon electrode conforming to the shape of said container and sealed therein with insulating compound applied at the smaller end thereof, a lining of fibrous material adjacent the inner surface of said container electrode, and a solution of an alkali salt enclosed within said container electrode.

14. A hermetically sealed device for yielding and storing electrical energy comprising a bottle-shaped container electrode, an inner electrode, said inner electrode projecting beyond the top of said container and sealed into said container with an insulating compound, the projecting part of said inner electrode being rendered non-porous by impregnation.

15. A hermetically sealed device for yielding and storing electrical energy comprising an outer lead shell, a carbon electrode enclosed within said shell, a part of said carbon electrode being insulated from said shell and part being in conductive relation therewith.

16. A hermetically sealed device for yielding and storing electrical energy comprising an outer lead shell, a carbon electrode enclosed within said shell, said carbon electrode being cut or grooved to increase the surface thereof.

17. A hermetically sealed device for yielding and storing electrical energy comprising an outer lead container, said container serving as one electrode, an inner electrode consisting of a carbon rod having a depolarizer on its surface, said surface being provided with indentations, a solution of sodium acetate and a separating medium between the lower part of said container and the lower part of said inner electrode, an insulating medium between the upper part of said container and the upper part of said inner electrode, and a base for said container sealed therein.

18. The method of operating a hermetically sealed device for storing and yielding of electrical energy through the transformation of chemical changes, which comprises limiting the externally impressed electromotive force to a value such that no gases are set free during the recharging period.

19. The method of storing electrical energy, which consists in forming potentially active chemical compounds by electrolytic action by an electromotive force not greater than that required to liberate gas from the electrolyte.

20. The method of operating a hermetically sealed device for the storing and yielding of electrical energy through the transformation of chemical changes, which consists in limiting the difference of potential between its two electrodes to a value less than that required to liberate gases from the electrolyte.

In witness whereof, we hereunto subscribe our names this 31st day of March A. D., 1920.

JAMES BUCKNER SPEED.
FRANKLIN HUTCHINSON, Jr.